United States Patent Office 3,660,300
Patented May 2, 1972

3,660,300
METHOD OF PREPARING OXIDIZED RADON SOLUTIONS
Lawrence Stein, Downers Grove, Ill., assignor to the United States of America as represented by the United States Atomic Energy Commission
No Drawing. Filed June 5, 1970, Ser. No. 43,990
Int. Cl. C09k *3/00*
U.S. Cl. 252—301.1 R                                        5 Claims

ABSTRACT OF THE DISCLOSURE

A solution of nonvolatile, oxidized radon is prepared by reacting elemental radon with a fluoride-containing oxidant and dissolving the radon compound formed thereby in a suitable nonreducing, water-free solvent.

CONTRACTUAL ORIGIN OF THE INVENTION

The invention described herein was made in the course of, or under, a contract with the United States Atomic Energy Commission.

BACKGROUND OF THE INVENTION

This invention relates to a method of making a solution of radon. More specifically, this invention relates to a method of making a solution of monvolatile radon in oxidized form. In still more detail, this invention relates to a method of making a solution of nonvolatile radon in oxidized form in a halogen fluoride or hydrogen fluoride solvent.

Radon is used principally in the medical field as a source of gamma radiation for the treatment of cancer. It can also be used as an activator for chemical reactions such as the polymerization or oxidation of organic compounds, as a neutron source when mixed with beryllium, and as a point source of gamma rays for radiography of metal welds or castings.

For medical purposes, radon gas is collected from radium-226 and sealed into gold or platinum capillary tubes. These are placed in holders adjacent to the tumors to be irradiated or implanted surgically in the tumors. Since radon has a half-life of only 3.8 days, it can be used with greater safety for this purpose than radioisotopes with longer half-lives. After the radiation dose has been delivered, the implants can be removed or can be left permanently in place without causing radiation injury to the patient.

Because very small volumes or radon gas must be handled, it is difficult to prepare gamma ray sources with exactly the desired radiation intensities by this method. Some gold or platinum tubing is usually wasted in the preparation of sources which are of too high or too low intensity and which are therefore rejected. Moreover, the capillary tubes are not the most suitable shapes for all irradiations. In some instances a number of sources of this type are required to provide uniform irradiation of a tumor, and the sources must then be distributed over the surface of the tumor or in the tissue to achieve the desired effect.

SUMMARY OF THE INVENTION

I have invented a method of making a solution of oxidized radon which is nonvolatile and which can be easily used to produce gamma radiation sources which are inexpensive and in which the amount of radiation available can be precisely controlled. By my method, elemental radon is made to react with a fluoride-containing oxidant, forming a radon compound which then dissolves in a nonreducing water-free solvent, forming a solution which can then be used to prepare gamma radiation sources which meet the before mentioned requirements.

It is therefore an object of this invention to provide a method for making a solution of radon.

It is a further object of this invention to provide a method for making a solution containing radon in oxidized form.

Finally, it is an object of this invention to provide a method for making a solution of radon in nonvolatile form.

These and other objects can be attained by reacting elemental radon with a fluoride-containing oxidant such as halogen fluoride or hexafluoronickelate ion to form a radon compound which dissolves in a suitable nonreducing, water-free solvent such as halogen fluoride or hydrogen fluoride, forming a solution of nonvolatile oxidized radon.

It is possible to make the radon solution by using elemental radon in the gaseous, liquid, or solid state. To use radon in the solid state, which is the preferred method, the solvent and oxidizing agent are first cooled to at least $-71°$ C., the freezing point of radon, in a small container. It has been found most convenient to use liquid nitrogen coolant at $-195°$ C. for this purpose, since the lower temperature does not affect the final product. The desired amount of radon is added to the container with the oxidizing agent and solvent and frozen. The mixture is then warmed to ambient temperature with occasional stirring. During the warming period, the radon melts and reacts, and the formation of the solution of oxidized radon is complete by the time ambient temperature is reached. The alternative method of making the solution with gaseous radon is to bubble the radon into a solvent solution containing the oxidizing agent.

The maximum amount of radon which can be put into solution is not known. However, solutions have been made containing $Rn^{222}$ at concentrations ranging from several millicuries to 3.5 curies per milliliter volume. It is presumed that there is no lower limit of concentration and that the upper limit is determined by either the solubility of the radon compound or by radiation decomposition of the solution.

It is important that the solvent be both nonreducing and water-free. This is necessary to prevent reduction of the radon and to prevent hydrolysis of the radon compound which can be caused by very small amounts of water in the solvent. A number of solvents known to be suitable include the halogen fluorides and anhydrous hydrogen fluoride.

Suitable fluoride-containing oxidants include a number of the halogen fluorides, such as $ClF$, $ClF_3$, $ClF_5$, $BrF$, $BrF_3$, $BrF_5$ and $IF_7$, and compounds which contain hexafluoronickelate ions, such as $K_2NiF_6$ and $K_3NiF_6$. The halogen fluorides may be used alone as both oxidant and solvent or dissolved in a suitable solvent such as another halogen fluoride or hydrogen fluoride. The compounds containing the hexafluoronickelate ions are best used by dissolving in anhydrous hydrogen fluoride, although other solvents may be suitable. The amount of oxidant necessary is a molecular concentration equal to or greater than the radon mole concentration.

Although the precise composition of the nonvolatile radon compound which remains after the solutions have been vacuum-distilled to dryness is not known, it is believed to be $RnF_2$. The oxidized radon may be present in the solutions as an ion, as a molecular compound, or as both.

Gamma radiation sources can be easily produced from the radon solutions by the process of the present invention. For example, a flat-shaped gamma source having a particular curie strength could be made by placing the radon solution of the proper strength on a flat metal, glass or plastic disc, evaporating the solution to dryness and coating or encapsulating the disc with metal or plastic to prevent hydrolysis of the radon compound. A gamma ray source for implantation into a tumor could be made by soaking a flexible porous cord in a radon solution of appropriate strength, evaporating the solution from the cord, and encapsulating the cord in an inert plastic to prevent hydrolysis. A gamma radiation source such as this could be implanted in a tumor and left in place because of its flexibility and because of the short half-life of radon.

The following examples are given as illustrative of the process of this invention and not to be taken as limiting the scope or extent of the invention.

Example I

In a shielded cell, gaseous $Rn^{222}$ was collected from a 5-Ci (curie) radium chloride solution, passed through a drying tube containing calcium sulfate and condensed in a trap on a metal vacuum line at $-195°$ C. using liquid nitrogen as the coolant. The gas was partially purified by distillation at $-78°$ C. after radiolytic hydrogen and oxygen were pumped off. Approximately 0.25 Ci of radon (1.5 μg.) was condensed in a polytrifluoromonochloroethylene plastic (Kel-F) tube containing 8 ml. of frozen bromine pentafluoride at $-195°$ C. The mixture was allowed to thaw and warm to room temperature for 1.5 hours, during which time it was shaken several times. At the end of this period, the radon was found to be concentrated in the liquid phase at the bottom of the tube. The position of the radon was determined by measuring the $\beta$-$\gamma$ emission of its daughters. The solution was then vacuum-distilled at room temperature. The bromine pentafluoride distillate was found to be inactive, and the radon was found to be concentrated in the dry residue remaining in the plastic tube.

Example II

Solutions of about 0.12 Ci of radon in 6 ml. $BrF_3$ and 0.32 Ci of radon in 4 ml. of $ClF_3$ were prepared in the same manner as previously described. The reaction of radon with $BrF_3$ was incomplete, probably because of partial condensation of the gas on the test tube walls above the frozen trifluoride. Five percent of the activity appeared in the first distillate fraction, whereas none appeared in later fractions. All distillate fractions from the chlorine trifluoride solution were found to be inactive.

Example III

Aliquots of a solution, prepared as above, which contained 15 m. Ci of radon per ml, of $BrF_3$ were removed with Kel-F pipets in a glove box and progressively diluted with inactive $BrF_3$. The solutions then showed $\beta$-$\gamma$ activities corresponding to the dilution factors. The solutions were centrifuged and decanted from test tube to test tube without loss of activity. To verify that radon was present in the diluted samples as well as the short-lived $\beta$-$\gamma$-emitting daughters, the activity was checked over a peroid of 22 days and was found to decay with the half-life of $Rn^{222}$. Some radiation decomposition of $BrF_3$ was noted in the undiluted stock solution, which changed from a yellow color to a deep orange color within three days. The reduction products ($Br_2$ and $BrF$) were distilled from the solution without volatilization of radon.

Example IV 1.5 ml. of a solution of 0.1 mole percent $K_2NiF_6$ in liquid hydrogen fluoride was frozen at $-195°$ C. in a Kel-F test tube. 1.5 m. Ci of $Rn^{222}$ was added to the tube and the mixture was warmed to room temperature with occasional agitation. The solvent was then vacuum-distilled. The distillate was found to be free of any radioactivity, which was concentrated in the residue in the test tube with the $K_2NiF_6$.

It can be seen from the foregoing examples that a solution of nonvolatile radon in oxidized form is readily formed by the method of this invention.

It is to be understood that the invention is not to be limited by the details given herein but that it may be modified within the scope of the appended claims.

The embodiments of the invention in which an exclusive property or privilege is claimed are defined as follows:

1. A method of making a solution of nonvolatile radon in oxidized form comprising: reacting elemental radon with a fluoride-containing oxidant selected from the group consisting of ClF, $ClF_3$, $ClF_5$, BrF, $BrF_3$, $BrF_5$, $IF_7$, $K_2NiF_6$ and $K_3NiF_6$ and dissolving said oxidized radon formed thereby in a solvent selected from the group consisting of halogen fluoride and anhydrous hydrogen fluoride.

2. The method of claim 1 wherein the molecular concentration of the fluoride-containing oxidant is equal to or greater than the molecular concentration of elemental radon.

3. The method of claim 1 wherein the fluoride-containing oxidant and the solvent are the same and are selected from the group consisting of ClF, $ClF_3$, BrF, $BrF_3$, $BrF_5$ and $IF_7$.

4. The method of claim 3 wherein the elemental radon is frozen, the oxidant and solvent are cooled to at least the freezing point of radon, the radon and oxidant and solvent are mixed together and the resulting mixture is permitted to warm to ambient temperature.

5. A solution of oxidized radon in a solvent selected from the group consisting of ClF, $ClF_3$, $ClF_5$, BrF, $BrF_3$, $BrF_5$, $IF_7$ and HF.

References Cited

Haseltine, "Some Solution Chemistry of Radon," Nuclear Science Abstracts, vol. 22, No. 14, 1968, p. 2841, Abs. No. 27,725.

CARL D. QUARFORTH, Primary Examiner

R. L. TATE, Assistant Examiner

U.S. Cl. X.R.

23—205